United States Patent [19]

Harimoto et al.

[11] Patent Number: 5,602,204
[45] Date of Patent: Feb. 11, 1997

[54] THERMOSETTING COMPOSITION

[75] Inventors: Toan Harimoto, Kakogawa; Toshiro Nanbu, Kobe; Jo Kawamura, Akashi; Hisao Furukawa, Kobe, all of Japan

[73] Assignee: Kanegafuchi Kagaku Kogyo Kabushiki Kaisha, Osaka, Japan

[21] Appl. No.: 703,718

[22] Filed: May 22, 1991

Related U.S. Application Data

[63] Continuation of Ser. No. 277,110, Nov. 29, 1988, abandoned.

[30] Foreign Application Priority Data

Nov. 30, 1987 [JP] Japan .................................. 62-302046

[51] Int. Cl.$^6$ ..................................... C08L 43/04
[52] U.S. Cl. ........................... 525/209; 525/100; 525/101
[58] Field of Search ..................................... 525/100, 101; 515/209

[56] References Cited

U.S. PATENT DOCUMENTS

| | | | |
|---|---|---|---|
| 3,883,453 | 5/1975 | Takahashi | 524/733 |
| 3,997,485 | 12/1976 | Dowbenko et al. | 260/22 |
| 4,480,072 | 10/1984 | Mallon | 525/61 |
| 4,613,451 | 9/1986 | Chang et al. | 252/182 |
| 4,657,986 | 4/1987 | Isayama et al. | 525/407 |
| 4,788,254 | 11/1988 | Kawakubo et al. | 525/100 |

FOREIGN PATENT DOCUMENTS

| | | |
|---|---|---|
| 0006517 | 1/1980 | European Pat. Off. . |
| 54-36395 | 3/1979 | Japan . |
| 56-084751 | 9/1981 | Japan . |
| 57-012058 | 1/1982 | Japan . |
| 57-36109 | 2/1982 | Japan . |
| 58-157810 | 9/1983 | Japan . |
| 58225155 | 4/1984 | Japan . |
| 62-084134 | 4/1987 | Japan . |
| 63-112610 | 5/1988 | Japan . |
| 63-112605 | 5/1988 | Japan . |
| 63-33512 | 7/1988 | Japan . |

*Primary Examiner*—Ralph H. Dean
*Attorney, Agent, or Firm*—Armstrong, Westerman, Hattori, McLeland & Naughton

[57] ABSTRACT

A thermosetting composition (A) a hydroxyl group-containing resin, (B) an alkoxysilane group-containing copolymer and (C) a curing catalyst. The film of the composition is excellent in not only adhesion, gel percentage and surface hardness but also solvent resistance, acid resistance, and stain resistance.

8 Claims, No Drawings

THERMOSETTING COMPOSITION

This application is a continuation of application Ser. No. 277,110 filed Nov. 29, 1988, now abandoned.

BACKGROUND OF THE INVENTION

The present invention relates to a thermosetting composition and more particularly to a thermosetting composition suitable for use of coatings for automobiles, industrial equipments, rattan furnitures, household electric appliances, plastics, and the like.

In thermosetting coatings, melamine resins such as alkyd melamine resins, acryl melamine resins or epoxy melamine resins have hitherto been used as a crosslinking agent. However, in such a case, there cannot be solved a problem that a bad-smelling of the melamine resins remains.

An object of the present invention is to provide a thermosetting composition with improved acid resistance being made the bad-smelling little by using an alkoxysilane group-containing copolymer instead of the melamine resins as the crosslinking agent.

Also, a further object of the present invention is to provide a thermosetting composition having excellent weatherability, acid resistance, stain resistance, corrosion resistance, appearance, curability at low temperature, adhesion, and the like, which are the characteristics of the alkoxysilane group-containing copolymer.

These and the other objects of the present invention will become apparent from the following description.

SUMMARY OF THE INVENTION

In accordance with the present invention, there is provided a thermosetting composition comprising (A) a hydroxyl group-containing resin, (B) an alkoxysilane group-containing copolymer and (C) a curing catalyst.

DETAILED DESCRIPTION

Examples of the hydroxyl group-containing resin (A) are resins for using as thermosetting coatings, for instance, an alkyd resin having an oil length of not more than 50% by weight, an oil free alkyd resin, an acrylic modified alkyd resin, an acrylic resin, an epoxy resin, a hydroxyl group-containing silicon oil, and the like. Concreate examples of the resin (A) are, for instance, soybean fatty acid short-oil alkyd resin, a coconut oil fatty acid short-oil alkyd resin, and the like. The hydroxyl group-containing resin (A) is not limited thereto. It is preferable that the hydroxyl group-containing resin (A) has a number average molecular weight of 500 to 40,000, more preferably from 1,500 to 40,000, and a hydroxyl value of 10 to 300 mgKOH/g, more preferably from 20 to 150 mgKOH/g. The weight ratio of the hydroxyl group-containing resin (A) to the alkoxysilane group-containing copolymer (B) is preferably from 9/1 to 1/9, more preferably from 7/3 to 2/8.

In the present invention, the hydroxyl groups in the resin (A) are reacted with the silyl groups in the alkoxysilane group-containing copolymer (B) to crosslink, thus the technique of the invention is clearly different from conventional techniques using the melamine resins as the crosslinking agent.

The hydroxyl group-containing resin (A) can be prepared according to usual manners.

The alkoxysilane group-containing copolymor (B) is a silyl group-containing vinyl polymer of which the main chain consists essentially of a polymer of a vinyl compound and which has on the polymer chain end or the side chain thereof at least one silicon atom combined with a hydrolyzable group per one polymer molecule.

The component (A) may be merely blended, so-called cold-blended, with the component (B), or the components (A) and (B) may be partially reacted, for instance, the component (A) can be so-called hot-blended with the component (B), i.e. the components (A) and (B) are blended then the mixture is heated to partially react the component (A) with the component (B).

The amount of the catalyst (C) is from 0.1 to 20 parts by weight, preferably from 0.1 to 10 parts by weight, per 100 parts by weight of the hydroxyl group-containing resin (A) and the alkoxysilane group-containing copolymer (B).

The alkoxysilane group-containing copolymer (B) can be prepared by copolymerizing a vinyl monomer with an alkoxysilane vinyl monomer. The copolymer (B) may partially contain urethane bonds or siloxane bonds in its main chain or side chains.

The vinyl monomer used in the present invention is not particularly limited. Examples of the vinyl monomer are, for instance, an unsaturated carboxylic ester such as methyl acrylate, methyl methacrylate, ethyl acrylate, ethyl methacrylate, butyl acrylate, butyl methacrylate, 2-ethylhexyl acrylate, 2-ethylhexyl methacrylate, stearyl acrylate, stearyl methacrylate, benzyl acrylate, benzyl methacrylate, cyclohexyl acrylate, cyclohexyl methacrylate, trifluoroethyl acrylate, trifluoroethyl methacrylate, pentafluoropropyl acrylate, pentafluoropropyl methacrylate, or a diester or half ester of a polycarboxylic acid such as maleic acid, fumaric acid or itaconic acid with an alcohol with 1 to 20 carbon atoms having a linear or branched chain; an aromatic hydrocarbon vinyl compound such as styrene, α-methylstyrene, chlorostyrene, styrenesulfonic acid, 4-hydroxystyrene or vinyl toluene; a vinyl ester such as vinyl acetate or vinyl propionate; an allyl compound such as diallyl phthalate; a nitrile group-containing vinyl compound such as acrylonitrile or methacrylonitrile; an epoxy group-containing vinyl compound such as glycidyl acrylate or glycidyl methacrylate; an amino group-containing vinyl compound such as dimethylaminoethyl acrylate, dimethylaminoethyl methacrylate, diethylaminoethyl acrylate, diethylaminoethyl methacrylate, vinylpyridine, aminoethyl vinyl ether; an amide group-containing vinyl compound such as acrylamide, methacrylamide, itaconic acid diamide, α-ethyl acrylamide, crotonamide, maleic acid diamide, fumaric acid diamide, N-vinylpyrrolidone, N-butoxymethyl acrylamide, N-butoxymethyl methacrylamide, N,N-dimethyl acrylamide, N-methyl acrylamide or acryloyl morpholine; a hydroxyl group-containing vinyl compound such as 2-hydroxyethyl acrylate, 2-hydroxyethyl methacrylate, 2-hydroxypropyl acrylate, 2-hydroxypropyl methacrylate, 2-hydroxyethyl vinyl ether, N-methylolacrylamide, N-methylol methacrylamide, "Aronix 5700" (commercially available from Toagosei Chemical Industry Co., Ltd.), "Placcel FA-1" [polycaprolactone containing acryloyl group at the side end and which has a number average molecular weight (hereinafter referred to as "$\overline{M}n$") of 230] (commercially available from Daicel Chemical Industries, Ltd.), "Placcel FA-4" (polycaprolactone containing acryloyl group at the side end and which has an $\overline{M}n$ of 572), "Placcel FM-1" (polycaprolactone containing methacryloyl group at the side end and which has an $\overline{M}n$ of 244) and "Placcel FM-4" (polycaprolactone containing methacryloyl group at the side end and which has an Mn of 600); an unsaturated carboxylic acid such as acrylic acid, methacrylic acid, maleic acid, fumaric acid or itaconic acid or a salt (for instance, alkali metal salt, ammonium salt, amine salt, and the like) thereof, an unsaturated carboxylic anhydride such as maleic anhydride or a salt thereof; an other vinyl compound such as vinyl methyl ether, vinyl chloride, vinylidene chloride, chloroprene, propylene, butadiene, isoprene, maleimide, N-vinylimidazole or vinylsulfonic acid; and the like.

Examples of the alkoxysilane vinyl monomer are, for instance,

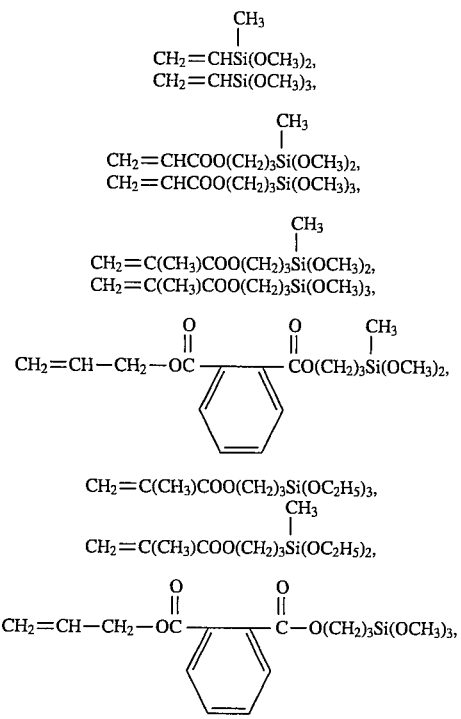

and the like.

It is preferable that the alkoxysilane group-containing copolymer (B) has 5 to 90% by weight, more preferably from 11 to 77% by weight, of units of the alkoxysilane vinyl monomer.

The alkoxysilane vinyl monomer can be copolymerized with the vinyl monomer in a manner, for instance, as described in Japanese Unexamined Patent Publications No. 36395/1979, No. 36109/1982, No. 157810/1983, No. 112605/1988, No. 112610/1988, and the like to give the copolymer (B). Especially, it is the most preferable that the copolymerization of the alkoxysilane vinyl monomer with the vinyl monomer is carried out by means of solution polymerization using an azo radical polymerization initiator such as azobisisobutyronitrile.

If necessary, there may be used a chain transfer agent for controlling the molecular weight of the alkoxysilane group-containing copolymer (B). Examples of the chain transfer agents are, for instance, n-dodecyl mercaptan, t-dodecyl mercaptan, n-butyl mercaptan, γ-mercaptopropyltrimethoxysilane, γ-mercaptopropyltriethoxysilane, γ-mercaptopropylmethyldimethoxysilane, γ-mercaptopropylmethyldiethoxysilane, $(CH_3O)_3Si-S-S-Si-(OCH_3)_3$, $(CH_3O)_3Si-S_8-Si(OCH_3)_3$, and the like. Particularly, when using the chain transfer agent having a hydrolyzable silyl group in its molecule, such as γ-mercaptopropyltrimethoxysilane, it is possible to introduce a hydrolyzable silyl group into the alkoxysilane group-containing copolymer (B) at the polymer end.

Non-reactive solvents are used in the above-mentioned copolymerization without particular limitations. Examples of the non-reactive solvents are, for instance, hydrocarbons such as toluene, xylene, n-hexane and cyclohexane, acetic esters such as ethyl acetate and butyl acetate, alcohols such as methanol, ethanol, isopropanol and n-butanol, ethers such as ethyl cellosolve, butyl cellosolve and cellosolve acetate, ketones such as methyl ethyl ketone, ethyl acetoacetate, acetylacetone, diacetone alcohol, methyl isobutyl ketone and acetone, and the like.

Examples of the curing catalyst (C) are, for instance, an organotin compound, a phosphoric acid or phosphoric ester including an acid phosphate, an addition reaction product of a phosphoric acid or an acid phosphate with an epoxy compound, an organic titanate compound, an organic aluminum compound, an acidic compound including a saturated or unsaturated polyvalent carboxylic acid or its anhydride, amines, a reaction product of an amine with an acid phosphate, an alkaline compound, a reactive silicon compound, and the like.

Concrete examples of the organotin compounds are, for instance, dibutyl tin dilaurate, dibutyl tin dimaleate, dioctyl tin dilaurate, dioctyl tin dimaleate, tin octoate, and the like. Concrete examples of the acid phosphate are, for instance, monomethyl phosphate, monoethyl phosphate, monobutyl phosphate, monooctyl phosphate, monodecyl phosphate, dimethyl phosphate, diethyl phosphate, dibutyl phosphate, dioctyl phosphate, didecyl phosphate, and the like. As to the addition reaction product of the phosphoric acid and/or monomeric acid phosphate with the epoxy compound, concrete examples of the epoxy compounds are, for instance, propylene oxide, butylene oxide, cyclohexene oxide, glycidyl methacrylate, glycidol, allyl glycidyl ether, γ-glycidoxypropyltrimethoxysilane, γ-glycidoxypropyltriethoxysilane, γ-glycidoxypropylmethyldimethoxysilane,

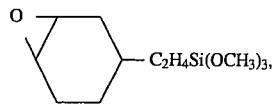

"Cardula E" (commercially available from Yuka Schell Kabushiki Kaisha), "Epicote 828" (epoxy resin) (commercially available from Yuka Shell Kabushiki Kaisha) or "Epicote 1001", and the like. Concrete examples of the acid anhydride are, for instance, maleic anhydride, and the like. Concrete examples of the acidic compound are, for instance, maleic acid, p-toluenesulfonic acid, and the like. Concrete examples of the amines are, for instance, hexylamine, di-2-ethylhexylamine, N,N-dimethyldodecylamine, dodecylamine, and the like. Concrete examples of the alkaline compounds are, for instance, sodium hydroxide, potassium hydroxide, and the like.

Among these catalysts (C), the organotin compound, the acid phosphate, the reaction product of the acid phosphate and the amine, the saturated or unsaturated polyvalent carboxylic acid or its anhydride, the reactive silicon compound, the organic titanate compound and the organic aluminum compound, and a mixture thereof are preferable, since these compounds have high activity.

In the thermosetting composition of the invention, a dehydrating agent may be used or not. The dehydrating agent can be used in order to obtain the stability of the thermosetting composition of the invention, for instance, the stability of the composition can be maintained for a long time, or even if using the composition repeatedly, the stability can be maintained. Examples of the dehydrating agents are, for instance, hydrolyzable ester compounds such as methyl orthoformate, ethyl orthoformate, methyl orthoacetate, ethyl orthoacetate, methyltrimethoxysilane, γ-methacryloyloxypropyltrimethoxysilane, vinyltrimethoxysilane, methyl silicate and ethyl silicate, and the like. The dehydrating agents may be added during the polymerization of the alkoxysilane group-containing copolymer (B), or added to the polymerization system.

In the composition of the present inventions, there can be added according to the uses thereof various additives such as various solvents, diluents, pigments including an extender pigment, ultraviolet absorbers, agents for preventing precipitation and leveling agents; celluloses such as nitrocellulose and cellulose acetate butyrate, resins such as epoxy resins, melamine resins, vinyl chloride resins, chlorinated propylene resins, chlorinated rubbers and polyvinyl butyral, and the like.

The thermosetting composition is applied to a substrate according to a usual manner such as dipping manner, spraying or brushing, and the coated film can be cured at a temperature of not less than 30° C., preferably from 55° to 350° C.

The present invention is more specifically described and explained by means of the following Examples in which all % and part are by weight unless otherwise noted. It is to be understood that the present invention is not limited to the Examples and various changes and modifications may be made in the present invention without departing from the spirit and scope thereof.

Reference Example 1

[Preparation of an alkoxysilane group-containing copolymer (B)]

A reactor equipped with a stirrer, a thermometer, a condenser, a nitrogen inlet tube and a dropping funnel was charged with 45.9 parts of xylene, and the reactor was heated to 110° C., introducing nitrogen gas thereto. A mixture (a) as shown below was added dropwise to the reactor at a uniform velocity through the dropping funnel for 5 hours.

| Mixture (a) | |
| --- | --- |
| Styrene | 12.8 parts |
| Methyl methacrylate | 50.1 parts |
| Stearyl methacrylate | 6.9 parts |
| α-Methacryloyloxypropyltrimethoxysilane | 30.2 parts |
| Xylene | 13.5 parts |
| 2,2'-Azobisisobutyronitrile | 4.5 parts |

After completing the addition of the mixture (a), 0.5 part of 2,2'-azobisisobutyronitrile and 5 parts of toluene were added dropwise to the reactor at a uniform velocity for 1 hour. After completing the addition, the resulting mixture was aged at 110° C. for 2 hours, then the mixture was cooled down and it was diluted with xylene to give a resin solution (1) having a solid concentration of 60%. The properties of the resin are shown in Table 1.

Reference Example 2

[Preparation of a hydroxyl group-containing resin (A)]

The same reactor used as in Reference Example 1 was charged with 31.3 parts of n-butyl acetate and 9.5 parts of xylene and the reactor was heated to 110° C., introducing nitrogen gas thereto. A mixture (b) as shown below was added to the reactor in the same manner as in Reference Example 1.

| Mixture (b) | |
| --- | --- |
| Xylene | 18 parts |
| Styrene | 28.3 parts |
| Methyl methacrylate | 7.1 parts |
| n-Butyl acrylate | 32.5 parts |
| Methacrylic acid | 0.3 part |
| Placcel FM-1* | 31.8 parts |
| 2,2'-Azobisisobutyronitrile | 1.8 parts |

(*: addition reaction product of 2-hydroxyethyl methacrylate and ε-caprolactone, molar ratio = 1:1)

After completing the addition of the mixture (b), 0.2 part of 2,2'-azobisisobutyronitrile and 3.8 parts of toluene were added dropwise to the reactor at a uniform velocity for 1 hour. After completing the addtion, the resulting mixture was aged at 110° C. for 2 hours, then the mixture was cooled down, and it was diluted with xylene to give a resin solution (2) having a solid concentration of 60%. The properties of the resin are shown in Table 1.

Reference Example 3

The same reactor as used in Reference Example 1 was charged with 45.9 parts of xylene and the reactor was heated to 110° C., introducing nitrogen gas thereto. A mixture (c) as shown below was added to the reactor in the same manner as in Reference Example 1.

| Mixture (c) | |
| --- | --- |
| Styrene | 29.4 parts |
| Methyl methacrylate | 44.1 parts |
| n-Butyl methacrylate | 30.5 parts |
| 2,2'-Azobisisobutyronitrile | 2.9 parts |
| Xylene | 8.7 parts |

After completing the addition of the mixture (c), 0.1 part of 2,2'-azobisisobutyronitrile and 1 part of toluene were added dropwise to the reactor at a uniform velocity for 1 hour. After completing the addtion, the resulting mixture was aged at 110° C. for 2 hours, then the mixture was cooled down, and it was diluted with xylene to give a resin solution (3) having a solid concentration of 60%. The properties of the resin are shown in Table 1.

Reference Example 4

[Preparation of a hydroxyl group-containing resin (A)]

The same reactor as used in Reference Example 1 was charged with 31.3 parts of butyl acetate and 9.5 parts of xylene and the reactor was heated to 110° C., introducing nitrogen gas thereto. A mixture (d) as shown below was added to the reactor in the same manner as in Reference Example 1.

| Mixture (d) | |
| --- | --- |
| Xylene | 18 parts |
| Styrene | 14 parts |
| Methyl methacrylate | 7 parts |
| n-Butyl acrylate | 26 parts |
| Methacrylic acid | 0.3 part |
| Placcel FM-1 | 39.7 parts |
| 2-Hydroxyethyl methacrylate | 13 parts |
| 2,2'-Azobisisobutyronitrile | 1.8 parts |

After completing the addition of the mixture (d), 0.2 part of 2,2'-azobisisobutyronitrile and 3.8 parts of toluene were added dropwise to the reactor at a uniform velocity for 1 hour. After completing the addition, the resulting mixture was aged at 110° C. for 2 hours, then the mixture was cooled down, and it was diluted with xylene to give a resin solution (4) having a solid concentration of 60%. The properties of the resin are shown in Table 1.

Examples 1–4 and Comparative Examples 1–4

A mill base as shown in Table 2 was kneaded for 1 hour in a paint shaker according to the formulation shown in Table 2. A cut back as shown in Table 2 was added to the kneaded mill base according to the formulation shown in Table 2 and the mixture was kneaded for 30 minutes in the paint shaker to give an enamel.

A non-treated steal plate was sanded with a No. 240 water-proof abrasive paper and was degreased with xylene. The obtained enamel was diluted with a mixed solvent of xylene and buthanol (weight ratio of xylene to buthanol= 70:30) to give a coating having a viscosity of 10 to 15 seconds by means of Iwata Cap method. The coating was air-sprayed on the treated steal plate, which was allowed to stand for 20 minutes and was baked at 140° C. for 30 minutes to give a film.

TABLE 2

|  | Ex. 1 | Ex. 2 | Ex. 3 | Ex. 4 | Com. Ex. 1 | Com. Ex. 2 | Com. Ex. 3 | Com. Ex. 4 |
|---|---|---|---|---|---|---|---|---|
| Mill base (part) | | | | | | | | |
| Hydroxyl group-containing resin | | | | | | | | |
| Resin solution (2) | 42 | — | 33 | — | 42 | — | — | 42 |
| Resin solution (4) | — | — | — | 24 | — | — | — | — |
| HARIPHTHAL SFG42-60X*[1] | — | 42 | — | — | — | — | 42 | — |
| Resin containg no hydroxyl group | | | | | | | | |
| Resin solution (3) | — | — | — | — | — | 42 | — | — |
| Titanium white R-CR93*[2] | 24 | 24 | 24 | 24 | 24 | 24 | 24 | 24 |
| Xylene | 1.6 | 1.6 | 1.6 | 1.6 | 1.6 | 1.6 | 1.6 | 1.6 |
| Grass beads (diameter: 2 mm) | 20 | 20 | 20 | 20 | 20 | 20 | 20 | 20 |
| Cut back (part) | | | | | | | | |
| Alkoxysilane group-containing copolymer | | | | | | | | |
| Resin solution (1) | 18 | 18 | 27 | 36 | 18 | 18 | — | — |
| Curing catalyst | | | | | | | | |
| BANSEMIN 125-60*[3] | — | — | — | — | — | — | 18 | 18 |
| DP-8*[4] | 0.36 | 0.36 | — | — | — | 0.36 | — | — |
| FARMIN DM-20*[5] | 0.36 | 0.36 | — | — | — | 0.36 | — | — |
| TN-801*[6] | — | — | 0.36 | 0.36 | — | — | — | — |
| Xylene | 13.7 | 13.7 | 14.1 | 14.1 | 14.4 | 13.7 | 14.4 | 14.4 |
| Total amount (part) | 120.02 | 120.02 | 120.06 | 120.06 | 120 | 120.02 | 120 | 120 |

(Notes)
*[1]: Soybeam fatty acid short-oil alkyd resin having a hydroxyl value of 70 to 80 and a number average molecular weight of 3,000 to 4,000 commercially available from Harima Kasei Kabushiki Kaisha.
*[2]: Titanium dioxide commercially available from Ishihara Industry Kabushiki Kaisha
*[3]: Butylated melamine resin commercially available from Harima Kasei Kabushiki Kaisha.
*[4]: Diocytyl phosphate commercially available from Daihachi Kagaku Kabushiki kaisha.
*[5]: N,N-dimethyldodecylamine commercially available from Kao Kabushiki Kaisha.
*[6]: Dioctyl tin maleate commercially available from Sakai Kagaku Kogyo Kabushiki Kaisha.

TABLE 1

| Resin solution | 1 | 2 | 3 | 4 |
|---|---|---|---|---|
| Non-volatile matter (%) | 60 | 60 | 60 | 60 |
| Viscosity (23° C., cps) | 900 | 4,400 | 19,400 | 5,100 |
| Acid value (mgKOH/g solid) | 0 | 2.0 | 0 | 2.0 |
| Hydroxyl value (mgKOH/g solid) | 0 | 73 | 0 | 148 |
| Color number (Gardner) | <1 | <1 | <1 | <1 |

As to the obtained film, the adhesion, hardness, gel percentage, toluene resistance, gasoline resistance and stain resistance were estimated as follows:

[Adhesion]

The cross-cut peeling test with a cellophane adhesive tape is conducted. That is, the film on the plate is cut by a cutter to form 100 squares having a size of 2 mm×2 mm and the procedure of adhesion-peeling off of a cellophane adhesive tape is conducted. In Table 3, 10 shows that the 100 squares remain and 0 shows that no square remains.

[Pencil hardness]

The hardness is measured according to JIS K 5400.

[Gel percentage]

The weight of the obtained film is measured ($W_1$). The film is dipped in an extractive solvent, acetone for 24 hours, and it is dried in a dryer having a temperature of 60° C. for 1 hour and is cooled. The weight of the film is measured ($W_2$). The percentage of $W_2$ to $W_1$ is shown in Table 3.

[Toluene resistance]

The baked film is rubbed ten times with an absorbent cotton impregnated with toluene and the surface of the film is observed with the naked eye.

O: No damage of the film is observed.

X: Loss of gloss of the film is evident.

[Gasoline resistance]

The baked film is rubbed ten times with an absorbent cotton impregnated with gasoline and the surface of the film is observed with the naked eye.

O: No damage of the film surface is observed

X: Loss of gloss of the film is evident.

[Stain resistance]

A line having a length of 2 cm and a width of 5 mm is marked on the film by using an oily marking ink (commercially available under the trade name "Magic ink") (black and red) and it is allowed to stand for 24 hours. After wiping the line with methanol, the surface is observed with the naked eye.

O: No trace of the ink is observed in the wipped area. (The line of the ink disappears.)

Δ: The line of the ink does not completely disappear and remains partially.

X: The line of the ink remains completely.

[Acid resistance]

A drop of a 38% sulfuric acid solution is spotted on the surface of the baked film, the film is allowed to stand over night, then it is washed with water and the film is observed with the naked eye.

O: No change is observed on the film.

X: Gross of the spotted part of the film is lowered.

The results are shown in Table 3.

What we claim is:

1. A thermosetting composition comprising:

(A) a hydroxyl group-containing acrylic resin having a hydroxyl value of 20 to 150 mg KOH/g, (B) an alkoxysilane group-containing acrylic copolymer and (C) a compound accelerating or promoting the reaction of said component (A) and said component (B).

2. The composition of claim 1, wherein said resin (A) has a number average molecular weight of 500 to 40,000.

3. The composition of claim 1, wherein said resin (A) has a number average molecular weight of 1,500 to 40,000.

4. The composition of claim 1, wherein said copolymer (B) has 5 to 90% by weight of units of an alkoxysilane vinyl monomer having a polymerizable unsaturated double bond and an alkoxysilane group, wherein said copolymer is derived from said vinyl monomer.

5. The composition of claim 1, wherein said accelerating or promoting compound (C) is at least one member selected from the group consisting of an organotin compound, an acid phosphate, a reaction product of an acid phosphate and an amine, a saturated polyvalent carboxylic acid, an unsaturated polyvalent carboxylic acid, a saturated polyvalent carboxylic acid anhydride, an unsaturated polyvalent carboxylic acid anhydride, a reactive silicon compound, an organic titanium compound and an organic aluminum compound.

6. The composition of claim 1, wherein the weight ratio of said resin (A) to said copolymer (B) is from 9/1 to 1/9.

7. The composition of claim 1, wherein the amount of said accelerating or promoting compound (C) is from 0.1 to 20 parts by weight based on 100 parts by weight of said resin (A) and said copolymer (B).

8. The composition of claim 5, wherein said reactive silicon compound is selected from the group consisting of γ-glycidoxypropyltrimethoxysilane, γ-glycidoxypropyltriethoxysilane, γ-glycidoxypropylmethyldimethoxysilane and

TABLE 3

|  | Ex. 1 | Ex. 2 | Ex. 3 | Ex. 4 | Com. Ex. 1 | Com. Ex. 2 | Com. Ex. 3 | Com. Ex. 4 |
| --- | --- | --- | --- | --- | --- | --- | --- | --- |
| Adhesion | 10 | 10 | 10 | 10 | 10 | 8 | 10 | 10 |
| Pencil hardness | 2H | H | 3H | 3H | HB | 3H | H | F |
| Gel percentage | 97 | 96.2 | 98.3 | 97 | 7.8 | 66.3 | 98 | 97 |
| Tolune resistance | O | O | O | O | X | X | O | X |
| Gasoline resistance | O | O | O | O | X | X | O | O |
| Stain resistance |  |  |  |  |  |  |  |  |
| Red | O | O | O | O | X | X | X | Δ |
| Black | O | O | O | O | X | X | Δ | Δ |
| Acid resistance | O | O | O | O | X | X | X | X |

As shown in Table 3, the films obtained in Examples 1 to 4 are excellent in not only adhesion, gel percentage and surface hardness but also solvent resistance and stain resistance. Therefore, it would be understood from the results that the thermosetting composition of the invention is an excellent coating composition.

In addition to the inagredients used in the Examples, other ingredients can be used in the Examples as set forth in the specification to obtain substantially the same results.

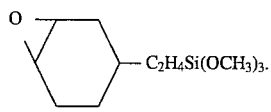

* * * * *